United States Patent [19]

Minato et al.

[11] 4,379,292
[45] Apr. 5, 1983

[54] METHOD AND SYSTEM FOR DISPLAYING COLORS UTILIZING TRISTIMULUS VALUES

[75] Inventors: Sachie Minato, Tokyo; Haruo Kamata, Kamakura, both of Japan

[73] Assignee: Nissan Motor Company, Limited, Yokohama, Japan

[21] Appl. No.: 213,116

[22] Filed: Dec. 4, 1980

Related U.S. Application Data

[63] Continuation of Ser. No. 12,212, Feb. 14, 1979.

[30] Foreign Application Priority Data

Feb. 22, 1978 [JP] Japan .................................. 53-18544

[51] Int. Cl.$^3$ .............................................. G09G 1/28
[52] U.S. Cl. .................................... 340/701; 315/383; 340/703; 340/812; 358/29
[58] Field of Search ................. 315/11, 12 R, 12 ND, 315/383; 358/10, 29, 80; 340/701, 703

[56] References Cited

U.S. PATENT DOCUMENTS

| 2,910,615 | 10/1959 | Moulton et al. | 315/383 X |
| 3,456,068 | 7/1969 | Wilhelmy | 358/10 |
| 3,479,448 | 11/1969 | Kollsman | 358/29 |
| 3,771,155 | 11/1973 | Hayashi et al. | 340/703 |
| 3,811,113 | 5/1974 | Saito et al. | 340/701 |
| 4,037,249 | 7/1977 | Pugsley | 358/80 |
| 4,123,775 | 10/1978 | Bugni | 358/10 |
| 4,149,152 | 4/1979 | Russo | 340/703 |

Primary Examiner—David L. Trafton

Attorney, Agent, or Firm—Lane, Aitken & Kananen

[57] ABSTRACT

A color displaying method comprises determining the CIE (Commission Internationale d'Eclairage) tristimulus values of a desired color to be displayed. The tristimulus values are converted into corresponding electrical signals in accordance with the relative luminance value of the source of radiations employed to produce the desired color. A system for displaying colors is also disclosed which includes an electro-optical color imaging device. The tristimulus values of the desired color are generated in a computer in response to a set of numerical data keyed through a data input device. The tristimulus values are converted into corresponding electrical signals which are then corrected in amplitude in accordance with the emission characteristics of the imaging device. The latter is driven in response to the amplitude-corrected electrical signals to produce the desired color. The electrical signals are amplitude corrected by having the imaging device produce a white light emission on a specified area of its imaging surface. A spectral analyzer analyzes the spectral components of the emitted white light to generate a set of signals representing the tristimulus values of the imaging device white light. The so-obtained tristimulus signals are compared with a set of reference signals representing the tristimulus value of a reference white light to generate a set of error signals, representing the differences between the imaging device white light and the reference white light, which are subtractively combined with the signals representing the tristimulus values of the desired color.

16 Claims, 4 Drawing Figures

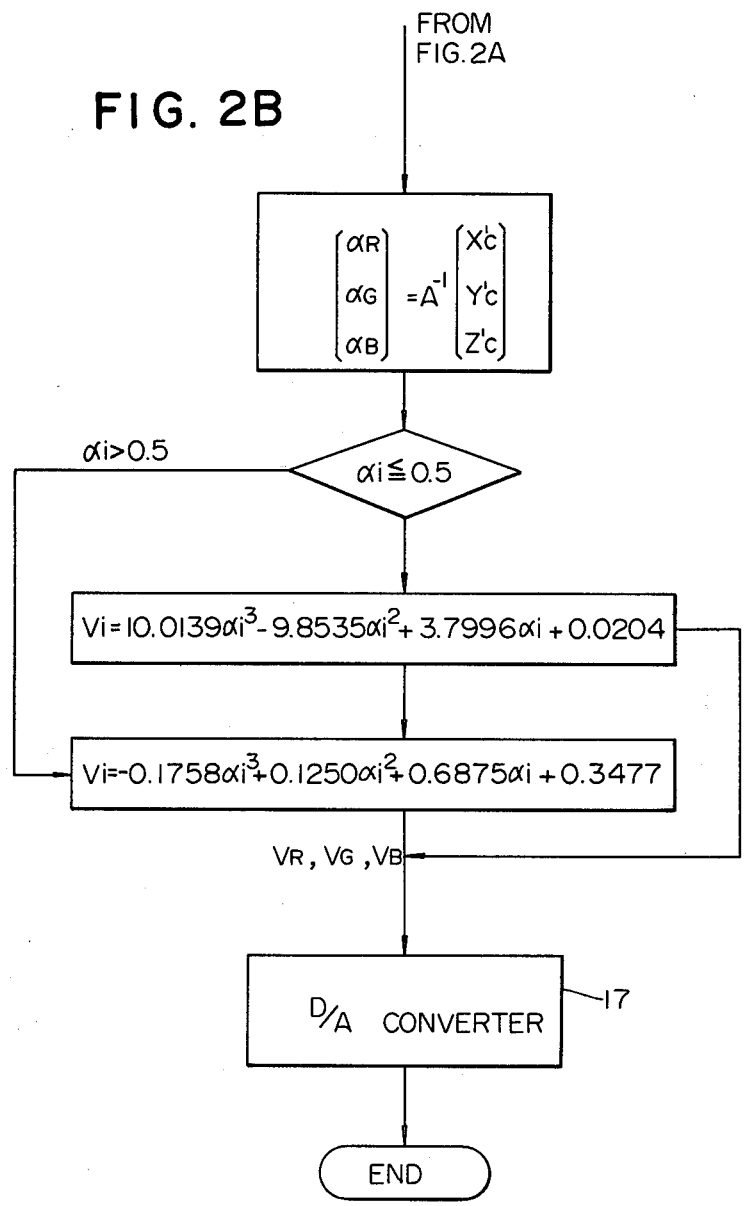

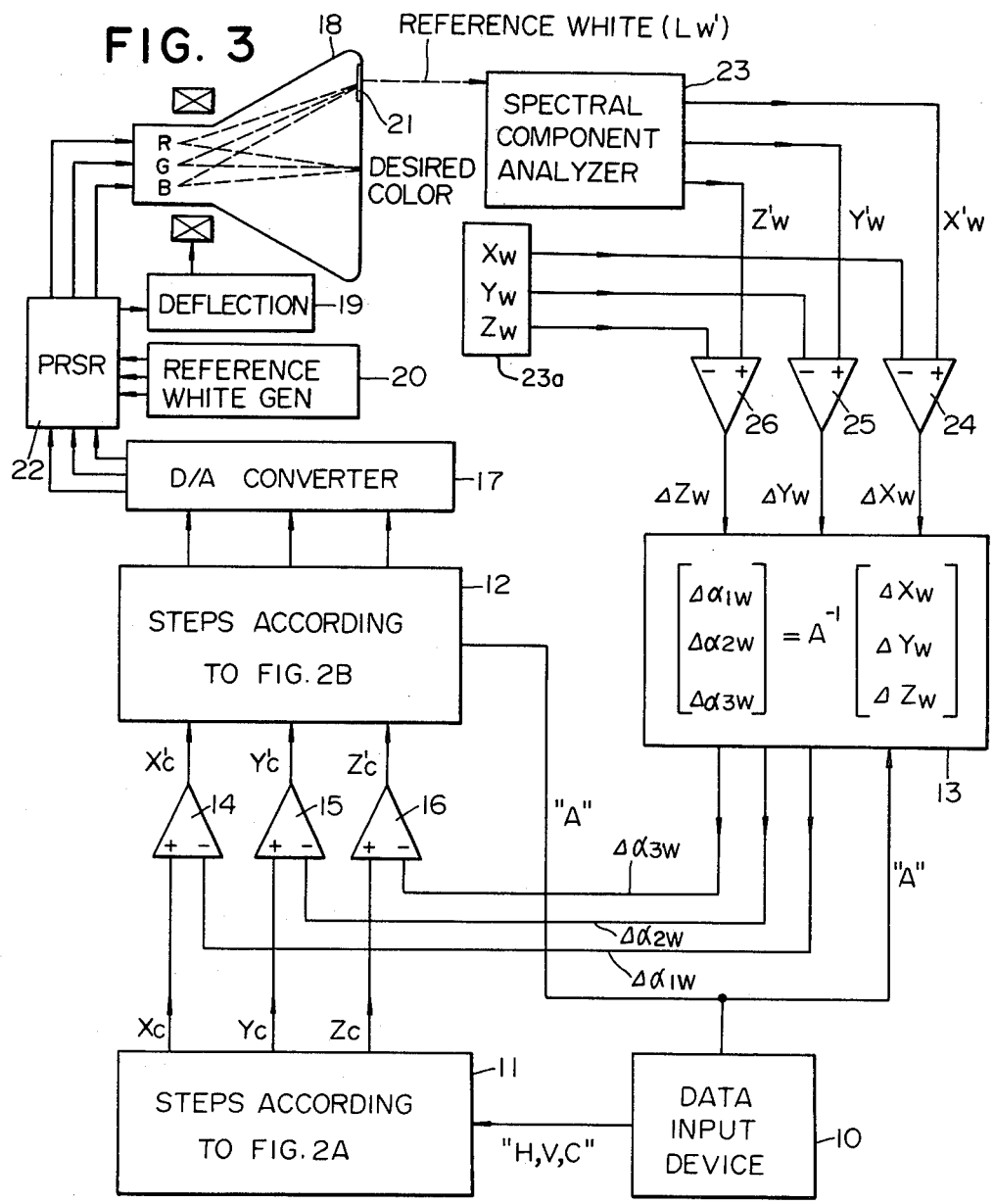

METHOD AND SYSTEM FOR DISPLAYING COLORS UTILIZING TRISTIMULUS VALUES

This is a continuation of application Ser. No. 012,212, filed Feb. 14, 1979.

FIELD OF THE INVENTION

The present invention relates to a method and system for displaying colors on a color imaging device, and, in particular, to a method and a system in which an electrical representation of the CIE tristimulus values of a desired color is used to produce the desired color.

BACKGROUND OF THE INVENTION

Prior art methods of photoelectrically displaying colors involve the use of color filters to separate the original color into spectrum components that are converted into corresponding electrical signals, the latter being used to reproduce the original color in a color imaging device.

SUMMARY OF THE INVENTION

An object of the invention is to provide a method and system for displaying desired colors.

Reproduction of a given or original color is a process known as "color matching" in which the spectral components of the given color are analyzed to yield a color having the same spectral components as those of the original or in which the tristimulus values of the given color are analyzed to yield a color having the same tristimulus values as those of the given color. With the latter process, where the reproduced color is a mixture of three or more radiations of different wavelengths such as red, green and blue, the color matching is a process of matching the tristimulus values of the radiations to be produced with the tristimulus values of the desired color. Since the light emitted from the display unit is not necessarily identical to the light reflected from the object, the problem is identifying or quantifying the primary factor(s) that is or are essential to evoking the same sensation of color, particularly with respect to brightness, as one would expect from the real object. One approach that could eliminate this problem is to compare the light emitted from the display unit with a reference color (white, for example) and a convenient way of doing this is to provide the reference color adjacent to or within the display unit screen. Since the brightness is determined by the luminance of the desired color relative to the luminance of the reference color, so that if the latter is maintained constant, the brightness of the desired color can be solely determined in relation to the reference color.

According to the invention, a color is reproduced on a display device such that it has the same tristimulus values as those of the original or a desired color sample, using a plurality of sources of radiations at different wavelengths. More specifically, the tristimulus values are modified in accordance with the emission characteristics of the radiation sources and are used to drive the display unit, so as to provide an additive mixture of radiations from the light sources on a display screen.

BRIEF DESCRIPTION OF THE DRAWINGS

The invention will be further described by way of example with reference to the accompanying drawings, in which:

FIGS. 2A and 2B are flow chart describing the procedure of deriving the voltage Vi from the color difference formula based on the Munsell color system; and FIG. 3 is a schematic illustration of the color display system of the invention.

DETAILED DESCRIPTION

Figure 1:
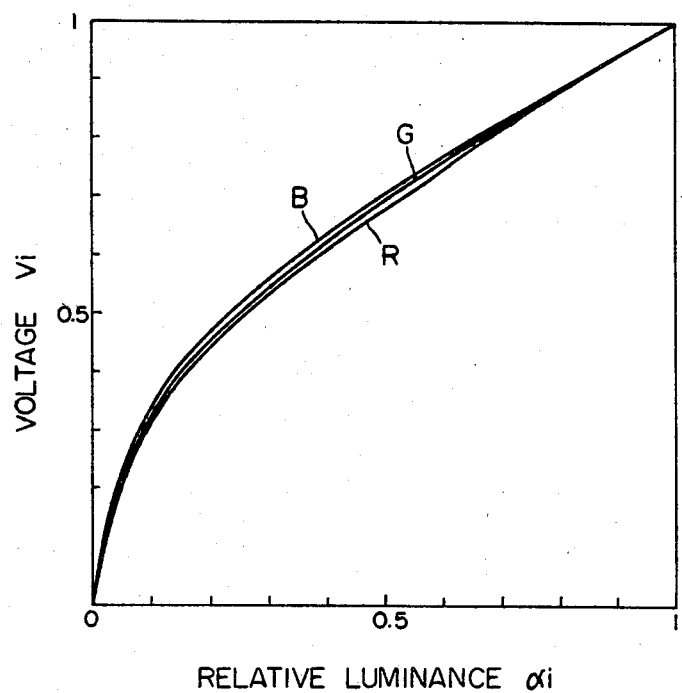
FIG. 1 is a graphic illustration of voltage Vi as a function of luminance factor $a_i$.

When a chromatic light "C" having tristimulus values Xc, Yc, and Zc is generated on a display unit such as a color picture tube, a white light "W" is produced in the display unit as a reference luminance, which white light is the brightest of the lights that can be generated in the display unit, and let "Lw" be the luminance of the reference white light and "Li" be the luminance of the radiation "i", and "n" be the number of sources of radiations. The following relation will be obtained:

$$Lw = \sum_{i=1}^{n} Li \tag{1}$$

Equation (1) is rewritten as $$\sum_{i=1}^{n} \left( \frac{Li}{Lw} \right) = 1 \tag{2}$$

Let Xw, Yw and Zw be the tristimulus values of the white light "W" and let "$x_w$" and "$y_w$" be the chromaticity coefficients. Since "W" is brightest, $$Yw = 1 \tag{3}$$

Therefore, $$Yw = \sum_{i=1}^{n} Yi = 1 \tag{4}$$

where $Yi = Li/Lw$.

Assume that the chromaticity coefficients $x_i$ and $y_i$ be constant regardless of the varying luminance as is usually so controlled in conventional color television systems Xw and Zw are given by $$Xw = \sum_{i=1}^{n} \left( \frac{x_i}{y_i} \right) Yi = \sum_{i=1}^{n} Xi \tag{5}$$

where $Xi = \left( \frac{x_i}{y_i} \right) Yi$ $$Zw = \sum_{i=1}^{n} \left( \frac{1 - x_i - y_i}{y_i} \right) Yi = \sum_{i=1}^{n} Zi \tag{6}$$

where $Zi = \left( \frac{1 - x_i - y_i}{y_i} \right) Yi$

Now let it be assumed that the radiations are additively mixed to provide light "C" and the luminance of a radiation "i" is given by $a_i Li$ (where $0 \leq a_i < 1$), the luminance Lc of light "C" is given by $$Lc = \sum_{i=1}^{n} \alpha_i Li \qquad (7)$$

Therefore, the following relation is obtained:

$$\frac{Lc}{Lw} = \sum_{i=1}^{n} \alpha_i \left(\frac{Li}{Lw}\right) \qquad (8)$$

Since $Yc = Lc/Lw$, the tristimulus values $Xc$, $Yc$ and $Zc$ of light C are given as follows:

$$Xc = \sum_{i=1}^{n} \alpha_i Xi \qquad (9)$$

$$Yc = \sum_{i=1}^{n} \alpha_i Yi \qquad (10)$$

$$Zc = \sum_{i=1}^{n} \alpha_i Z_i \qquad (11)$$

Consider now a matrix A which is given by $$A = \begin{bmatrix} X1, X2, \ldots Xn \\ Y1, Y2, \ldots Yn \\ Z1, Z2, \ldots Zn \end{bmatrix} \qquad (12)$$

then the following relation holds:

$$\begin{bmatrix} Xc \\ Yc \\ Zc \end{bmatrix} = A \begin{bmatrix} \alpha_1 \\ \alpha_2 \\ \vdots \\ \alpha_n \end{bmatrix} \qquad (13)$$

The matrix A is determined by both the chromaticity coefficients ($x_i$, $y_i$) of radiation sources and the luminance $Li$ which is used to establish the reference white light "W". These values are all measurable. If three mutually independent light sources are employed to give a chromatic light "C", the luminance factor $\alpha_i$ of that color is given as follows:

$$\begin{bmatrix} \alpha_1 \\ \alpha_2 \\ \alpha_3 \end{bmatrix} = A^{-1} \begin{bmatrix} Xc \\ Yc \\ Zc \end{bmatrix} \qquad (14)$$

where $A^{-1}$ is the inverse matrix of matrix A. In the case of n being equal to or greater than four, radiations of different colors which can be produced are given by the following equation:

$$\begin{bmatrix} \alpha 1 \\ \alpha 2 \\ \vdots \\ \alpha_n \end{bmatrix} = (A^t \cdot A)^{-1} \cdot A^t \begin{bmatrix} Xc \\ Yc \\ Zc \end{bmatrix} \qquad (15)$$

where $A^t$ is the transposed matrix of A.

The voltage Vi required to produce radiations with a relative luminance or luminance factor $\alpha_i$ is expressed by the relation $\alpha_i = f_i(V_i)$, so that $V_i = g_i(\alpha_i)$ where $g_i$ is an inverse function of $f_i$.

Description now follows in respect of an application of the concept of the invention, in which a given color is reproduced in terms of Hue (color), Value (lightness) and Chroma (saturation) according to the Munsell color system.

The Hue, Value and Chroma by the notation of the Munsell color system are correlated with the tristimulus values X, Y, Z as described in JIS (Japan Industrial Standards) Z 8721. Any given set of values for Hue, Value and Chroma has a corresponding set of tristimulus values X, Y, Z so that it permits generation of voltage Vi to be applied to a color display device which produces light from a light source "i". Since it is much easier to specify a given color with the Munsell color system than with the XYZ colorimetric system or RGB colorimetric system, the present invention provides a very convenient way of color identification. Since the afore-mentioned Japanese Industrial Standards enumerates lists of Hue, Value and Chroma in discrete values in relation to the tristimulus values X, Y and Z, it will be necessary to interpolate values which lie between the listed values. Approximated correlation can be made by using a set of color difference formulae according to a Uniform Color space established by the Japan Color Research Institute (JCRI), 1975 (L*, a', b')

$$L^* = 116(Y/Y_0)^{\frac{1}{3}} - 16$$

$$a' = 500ka[(X/X_0)^{\frac{1}{3}} - (Y/Y_0)^{\frac{1}{3}}]$$

$$b' = 200kb[(Y/Y_0)^{\frac{1}{3}} - (Z/Z_0)^{\frac{1}{3}}]$$

where, $X_0 = 97.976$, $Y_0 = 100.000$, $Z_0 = 118.028$ if $(X/X_0)^{\frac{1}{3}} - (Y/Y_0)^{\frac{1}{3}} > 0$, ka = 1.111 if $(X/X_0)^{\frac{1}{3}} - (Y/Y_0)^{\frac{1}{3}} < 0$, ka = 0.958 if $(Y/Y_0)^{\frac{1}{3}} - (Z/Z_0)^{\frac{1}{3}} > 0$, kb = 0.699 if $(Y/Y_0)^{\frac{1}{3}} - (Z/Z_0)^{\frac{1}{3}} < 0$, kb = 1.234 and where L*, a' and b' have the following relations to Hue (H), Value (V) and Chroma (C):

$$L^* = 10V, \quad a' = 5C \cos\theta, \quad b' = 5C \sin\theta,$$

wherein $\theta = (2\pi/100)H$.

The above-described relations can be rewritten as follows:

$$X = X_o \left(\frac{5C\cos\theta}{500Ka} + \frac{10V + 16}{116}\right)^3 \qquad (16)$$

$$Y = Y_o \left(\frac{10V + 16}{116}\right)^3 \qquad (17)$$

$$Z = Z_o \left(\frac{10V + 16}{116} - \frac{5C\sin\theta}{200Kb}\right)^3 \qquad (18)$$

In a practical embodiment of the invention, a conventional color television receiver is employed to serve as the color display unit. The chromaticity coefficients of the red, green and blue components of the color television receiver are as follows:

Red: $X_R = 0.628$, $Y_R = 0.346$

Green: $X_G = 0.286$, $Y_G = 0.588$

Blue: $X_B=0.150$, $Y_B=0.070$

FIG. 1 is a plot of voltage Vi as a function of luminance factor $\alpha_i$ of red, green, and blue components, of the light emitted from the screen of the color television receiver. As illustrated R, G, B components adopt substantially the same characteristic curves which can be approximated by the following Equations:

$$Vi = 10.0139\alpha_i^3 - 9.8535\alpha_i^2 + 3.7996\alpha_i + 0.0204 \quad (19)$$

when $0 \leq \alpha_i \leq 0.5$ $$Vi = -0.1758\alpha_i^3 + 0.1250\alpha_i^2 + 0.6875\alpha_i + 0.3477 \quad (20)$$

when $0.5 < \alpha_i \leq 1.0$

The tristimulus values of the reference white light are given as follows:
$X_w = 0.9804$
$Y_w = 1.000$
$Z_w = 1.1812$ By using the above data, the matrix A is obtained as follows:

$$A = \begin{bmatrix} 0.4746 & 0.3075 & 0.1955 \\ 0.2626 & 0.6458 & 0.0912 \\ 0.0197 & 0.1450 & 1.0165 \end{bmatrix}$$

The inverse matrix of A is thus given by $$A^{-1} = \begin{bmatrix} 2.7962 & -1.2359 & 0.4279 \\ -1.1528 & 2.0898 & 0.0342 \\ 0.1096 & -0.2740 & 0.9877 \end{bmatrix}$$

When the tristimulus values Xc, Yc and Zc are given, the luminance factors $\alpha_R$, $\alpha_G$ and $\alpha_B$ of the red, green and blue components of the color television receiver will be given as follows:

$$\begin{bmatrix} \alpha_R \\ \alpha_G \\ \alpha_B \end{bmatrix} = A^{-1} \begin{bmatrix} Xc \\ Yc \\ Zc \end{bmatrix} \quad (21)$$

These luminance factors are used to substitute for the luminance factor $\alpha_i$ of Equation 19 or 20 to obtain the voltage Vi.

Figure 2A:
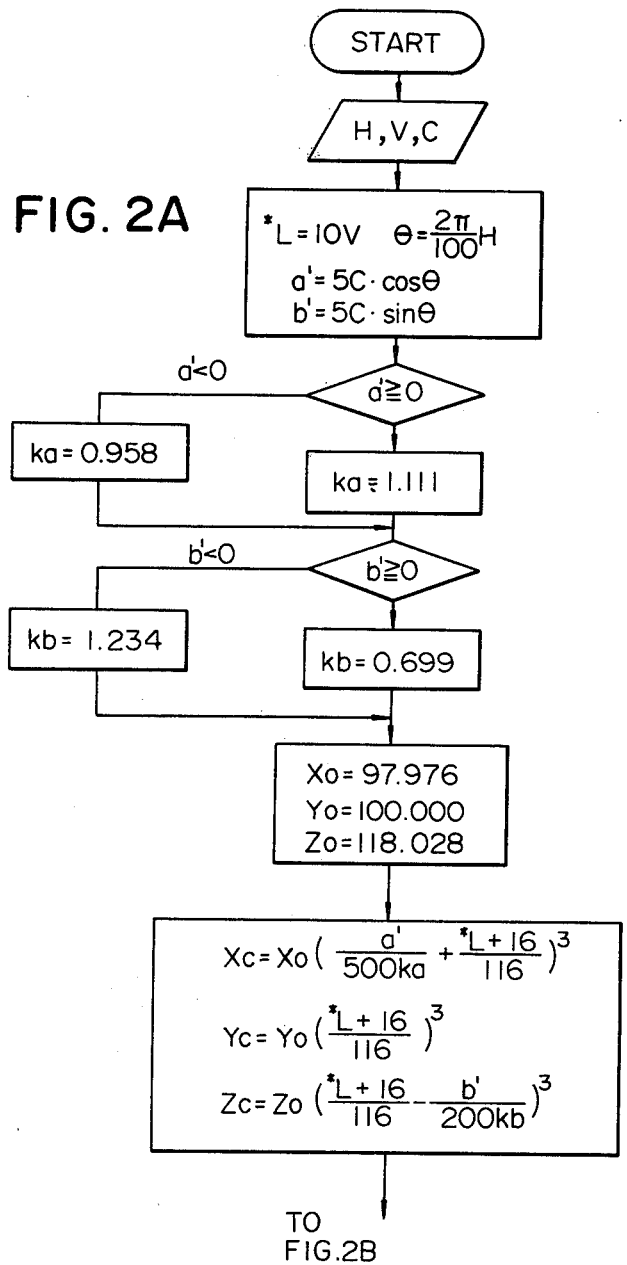

FIG. 2 is a flow chart illustrating the procedures required to obtain the voltage Vi using the color difference formula of the Munsell color system in which Hue, Value and Chroma are expressed by H, V and C, respectively.

The present invention thus permits generation of a color sample which has the same tristimulus values as those of the desired color and is correlated with the luminous characteristics of the light reflected from an object.

FIG. 3 is an illustration of a color displaying system of the present invention embodying the method as described previously. The system comprises a data input device 10 for keying various numerical data into a general purpose computer which is identified by several sections 11, 12 and 13. Numerical data representing the Munsell color system's Hue, Value and Chroma are first fed into the computer 11 to permit it to process the input data in accordance with the steps shown in FIG. 2A to obtain output data representing the tristimulus values Xc, Yc and Zc of a desired color. These output data are fed respectively to the noninverting input terminals of comparators 14, 15 and 16 for comparison with corrective signals supplied from the computer 13. Each of output signals from the comparators 14 to 16 is applied to the computer 12 to proceed with the steps illustrated in FIG. 2B. More specifically, the corrected tristimulus values Xc', Yc' and Zc' are multiplied by the inverse matrix of A which is applied to the computer 12 from the data input device 10. The digital signal representing the voltages $V_R$, $V_G$ and $V_B$ are applied to a digital-to-analog converter 17 and the analog-valued voltages are then applied to the red, green and blue electron guns of a cathode ray tube 18. A beam deflection circuit 19 is designed to deflect the cathode ray beam to emit a reference or test white light in response to a set of reference voltages supplied through a processor 22 from a reference white generator 20. The beam is so directed that the reference white light Lw' is emitted from a specified area of the cathode ray screen as at 21. A spectral component analyzer 23 is responsive to the emitted white reference light Lw' to analyze the spectral components of the received white light to derive a set of signals Xw', Yw' and Zw, which are the tristimulus values of the white reference light reflecting the emission characteristics of the phosphor materials of the primary colors red, green, and blue of the cathode ray screen. The signals Xw', Yw' and Zw' are applied to the noninverting input terminals of comparators 24, 25 and 26 respectively for comparison with reference voltages representing, respectively the tristimulus values Xw, Yw and Zw of the absolute reference white light Lw provided by a calibration unit 23a. Since the signals applied to the noninverting input terminals of the comparators 24 to 26 are indicative of the emission characteristics of the primary color (red, green, and blue) phosphor materials, the outputs of the comparators 24 to 26 are representative of the deviation of the emission characteristics from the absolute tristimulus values provided by the unit 23a. The deviation representative signals $\Delta Xw$, $\Delta Yw$ and $\Delta Zw$ from the comparators 24 to 26 are fed into the computer 13 where the input signals are processed with the numerical data representing the matrix A to derive error components $\Delta\alpha_{1w}$, $\Delta\alpha_{2w}$ and $\Delta\alpha_{3w}$ of the luminance factors of the reference white in accordance with the following Equation:

$$\begin{bmatrix} \Delta\alpha_{1w} \\ \Delta\alpha_{2w} \\ \Delta\alpha_{3w} \end{bmatrix} = A^{-1} \begin{bmatrix} \Delta X_w \\ \Delta Y_w \\ \Delta Z_w \end{bmatrix} \quad (22)$$

The error components so derived are applied to the inverting input terminals of the comparators 14, 15 and 16, respectively.

The electron beams of the cathode ray tube 18 are intensity modulated in response to the output signals from the digital-analog converter 17 through the processor 22 and deflected by the deflection circuit 19 to emit radiations of different basic colors, so that the emitted radiations are corrected towards and blend into the desired color. Since the so-blended color is corrected for the particular color-emission characteristics of the imaging device and is accordingly representative of the tristimulus values of the desired color sample, a realistic color is reproduced.

What is claimed is:

1. A method for displaying a desired color, said method comprising the steps of:
   - (A) converting in a computer the tristimulus values of a desired color into corresponding electrical signals;
   - (B) providing said so-converted electrical signals to a color display means that displays a color representative of the desired color in a color display area in response to said so-provided electrical signals;
   - (C) causing said color display means to display a reference light in a display area thereof other than said color display area;
   - (D) determining the tristimulus values of said reference light;
   - (E) generating tristimulus values representative of a predetermined standard light, said generating step being independent of step (C);
   - (F) comparing the so-determined tristimulus values of said reference light with said tristimulus values representative of said predetermined, standard light;
   - (G) generating in said computer an error signal representative of the compared difference between said tristimulus values of said reference light and said predetermined standard light; and
   - (H) combining said error signal with said electrical signals representative of the tristimulus values of the desired color to correct the displayed color for the differences between the reference light provided by said display means and said predetermined standard light.

2. The method claimed in claim 1 further comprising, prior to the step of converting, the steps of:
   - providing input information representative of a desired color in accordance with a first color specification system; and
   - converting said so-provided input information into equivalent tristimulus values.

3. The method claimed in claim 2 wherein said providing step includes:
   - providing input information defining the desired color in terms of the hue, chroma, and value of the Munsell color system.

4. The method claimed in claim 1 wherein said reference light is a white light.

5. The method of claim 1 wherein said determining step further comprises the steps of:
   - (A.1) imaging the reference light on an optical analyzing means;
   - (A.2) causing said optical analyzing means to optically analyze the so-imaged reference light to provide electrical signals representative of the reference light tristimulus values.

6. The method claimed in claim 5 wherein said comparing step further comprises:
   - (E.1) providing an electrical signal representative of the tristimulus values of said predetermined standard light; and
   - (E.2) comparing the electrical signals representative of the tristimulus values of said predetermined standard light with the electrical signals representative of the tristimulus values of said analyzed reference light.

7. A system for displaying color comprising:
   display means for generating and displaying an image including a reference light image in a first display area of said display means and a color image in another display area of said display means in response to applied electrical signals;
   information input means connected to said display means for receiving, as an input, information representative of a desired color to be displayed and for converting said input information into said applied electrical signals to cause said display means to generate and display in the other display area a color representative of said input information;
   analyzing means optically coupled to said display means for analyzing the reference light image and providing analyzed values representative thereof;
   standard means independent of said analyzing means for continuously producing standard values which represent a predetermined standard light;
   comparator means for continuously comparing said analyzed values and said standard values and for producing error signals representative of the difference between said analyzed values and said standard values, said error signals being provided to said display means for modifying said applied electrical signals in accordance with the difference between the reference light image values and said predetermined standard image value.

8. The system claimed in claim 7 wherein:
   said reference light provided by said display means is a white light.

9. The system claimed in claim 7 wherein:
   said display means includes a display surface having an ordered matrix of red, green, and blue color emitters, said emitters selectively responsive to said applied electrical signals to emit their respective colors to generate the primary and secondary colors in accordance with said input information and to generate said reference light area.

10. The system claimed in claim 9 wherein said display means comprises:
    a cathode ray tube means having an ordered matrix of red, green, and blue phosphors selectively caused to emit light in response to electron beam irradiation.

11. The system claimed in claim 7 wherein:
    said input information is the hue, chroma, and value of the desired color in the Munsell color system.

12. The system claimed in claim 11 wherein:
    said information input means converts said input information into the red, green, and blue tristimulus values of said input information.

13. The system claimed in claim 7 wherein said analyzing means comprises:
    a spectral component analyzer for receiving light from said reference light image and analyzing said reference light image to provide the tristimulus values of said received reference light image, and wherein said standard means provides tristimulus values of said predetermined standard light.

14. The system claimed in claim 13 wherein:
    said comparator means compares the soanalyzed tristimulus values of said reference light with said tristimulus values of a predetermined standard light and provides said error signals representative of the difference between the emission characteristics of said display means and said predetermined standard light.

15. A color display system comprising:
    a data input device for keying a set of numerical data;

first means for generating a set of first electrical signals representing the tristimulus values of a desired color in response to said keyed numerical data; and second means for generating radiations of different basic colors in response to said electrical signals;

said first means comprising a plurality of comparators 14, 15, 16 each having a first input terminal receptive of a respective one of said first electrical signals and a second input terminal receptive of an error correction signal to generate a set of second electrical signals $X_c'$, $Y_c'$, $Z_c'$, said second means comprising a cathode ray tube 18 having a plurality of electron beam generating means and a plurality of light emissive areas for generating radiations of different wavelengths in response to impingement of the electron beams thereo, means 12 for converting said second electrical signals in accordance with the emission characteristics of said light emissive areas to modulate the intensity of said electron beams, means for causing said electron beams to produce a white light in a specified area 21 of said cathode ray tube screen, means for deflecting the intensity modulated electron beams to produce an image which is a blend of said radiations of different wavelengths in different areas of said cathode ray tube screen, a spectral component analyzer 23 for analyzing the spectral components of said white light for generating a set of third electrical signals $X_w'$, $Y_w'$, $Z_w'$ representing the tristimulus values of said white light, a plurality of second comparators each having a first input terminal receptive of a respective one of said third electrical signals $X_w'$, $Y_w'$, $Z_w'$ and a second input terminal receptive of a respective one of a set of reference signals $X_w$, $Y_w$, $Z_w$ representing the tristimulus values of a reference white light to generate a set of fourth electrical signals $\Delta X_w$, $\Delta Y_w$, $\Delta Z_w$ representing the difference between said third and reference signals, and means for multiplying said fourth electrical signals by the inverse matrix of a set of said input data to generate a set of fifth electrical signals $\Delta \alpha_{1w}$, $\Delta \alpha_{2w}$, $\Delta \alpha_{3w}$ for application to the second input terminals of said first comparators.

16. A method of color control in a visual display using a cathode ray tube which has a separate electron source for each of three primary colors comprising:
 (a) inputting values for Hue, Value and Chroma according to the Munsell color system into a computer from a data input device;
 (b) determining the tristimulus values for each of the three primary colors in said computer corresponding to the Munsell color system values inputted to the computer;
 (c) using the determined tristimulus values to produce signals and energizing said electronic sources with said signals;
 (d) focusing at a given position on the screen of said cathode ray tube, the beams produced by each of said electron source to produce a white spot;
 (e) analyzing said white spot and producing tristimulus values for each of said three primary colors:
 (f) generating tristimulus values for each of said three primary colors which values represent absolute white, said step of generating being independent of step (e);
 (g) continuously comparing in said computer each of the tristimulus values obtained in step (e) with said values obtained in step (f) which represent absolute white;
 (h) producing error signals for each of the three primary colors determined from the comparison of step (e);
 (i) modifying the values determined by said computer in step (b) using said error signals;
 (j) repeating step (c) using the modified values obtained in step (i) in place of the original values used in step (c); and
 (k) repeating steps (d) to (j).

* * * * *